United States Patent [19]
> Martin

[11] Patent Number: 4,867,266
[45] Date of Patent: Sep. 19, 1989

[54] SEISMIC ENERGY SOURCE

[76] Inventor: Philip N. Martin, P.O. Box 471143, Tulsa, Okla. 74147-1143

[21] Appl. No.: 7,181

[22] Filed: Jan. 27, 1987

[51] Int. Cl.[4] ............................................. G01V 1/104
[52] U.S. Cl. ................................... 181/106; 181/113; 181/116; 175/1
[58] Field of Search ............... 181/106, 113, 116, 117, 181/103, 107, 401; 102/204, 275.6, 275.11, 275.12; 175/1, 2, 4.5, 4.55

[56] References Cited
U.S. PATENT DOCUMENTS

| | | | |
|---|---|---|---|
| 2,953,214 | 9/1960 | Merten | 181/107 |
| 2,992,694 | 7/1961 | Musgrave et al. | 181/107 |
| 3,048,235 | 8/1962 | Itria | 181/103 |
| 3,050,149 | 8/1962 | Itria et al. | 181/107 |
| 4,063,509 | 12/1977 | Leonard et al. | 175/4.59 |
| 4,313,380 | 2/1982 | Martner et al. | 181/116 |
| 4,324,310 | 4/1982 | Wener et al. | 181/116 |
| 4,497,044 | 1/1985 | Silverman | 181/116 |
| 4,719,607 | 1/1988 | Airhart | 367/75 |

Primary Examiner—Thomas H. Tarcza
Assistant Examiner—Ian J. Lobo
Attorney, Agent, or Firm—Head & Johnson

[57] ABSTRACT

An assembly is provided for generating seismic signals in the earth utilizing one or more shells. A tubular barrel made of frangible material, such as plastic, has a shell positioned within it, the shell having a head with an electrically actuated primer button. A continuity block is positioned within the barrel providing electrical continuity with the shell and the primer button. Conductors are connected to the continuity block and extending exteriorly of the barrel, the shell being fired by connecting the conductors to a voltage source. The barrel may be elongatd to house a plurality of spaced apart shells, the first shell being electrically fired and the other shells being fired by percussion. Each percussion shell is engaged by a plunger which is actuated by the slug fired from the adjacent shell so that upon firing of the electric shell, the slug thereof fires the first percussion shell and each percussion shell thereafter is fired in sequence. Alternatively, the first shell may be a percussion shell fired by a rod extending to the earth's surface.

12 Claims, 9 Drawing Sheets

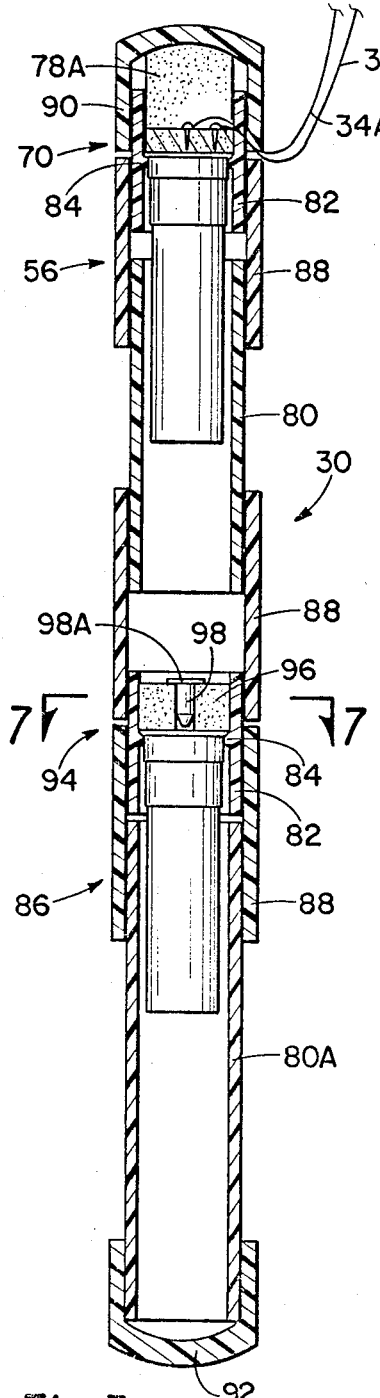
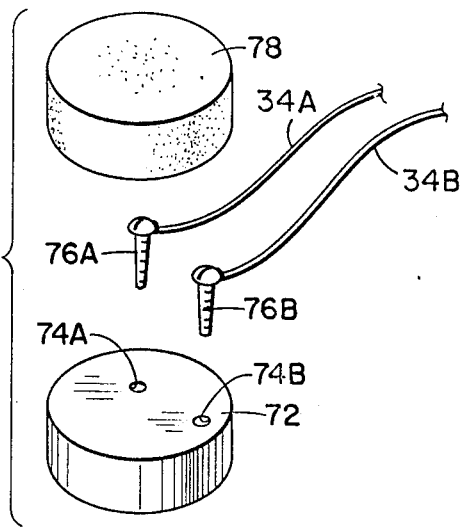
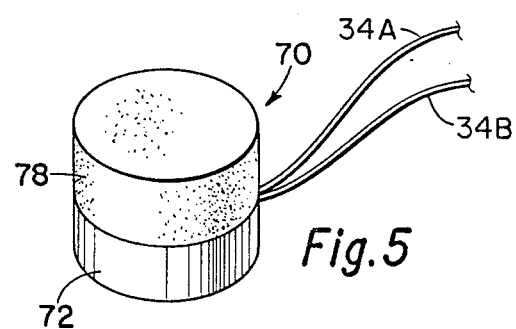
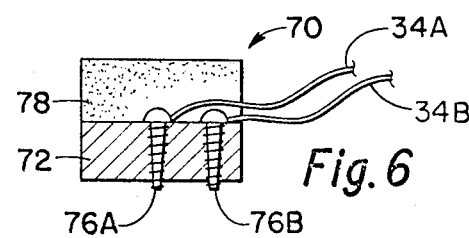
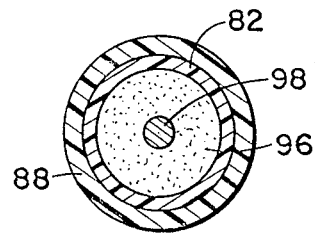
Fig. 3
Fig. 4
Fig. 5
Fig. 6
Fig. 7

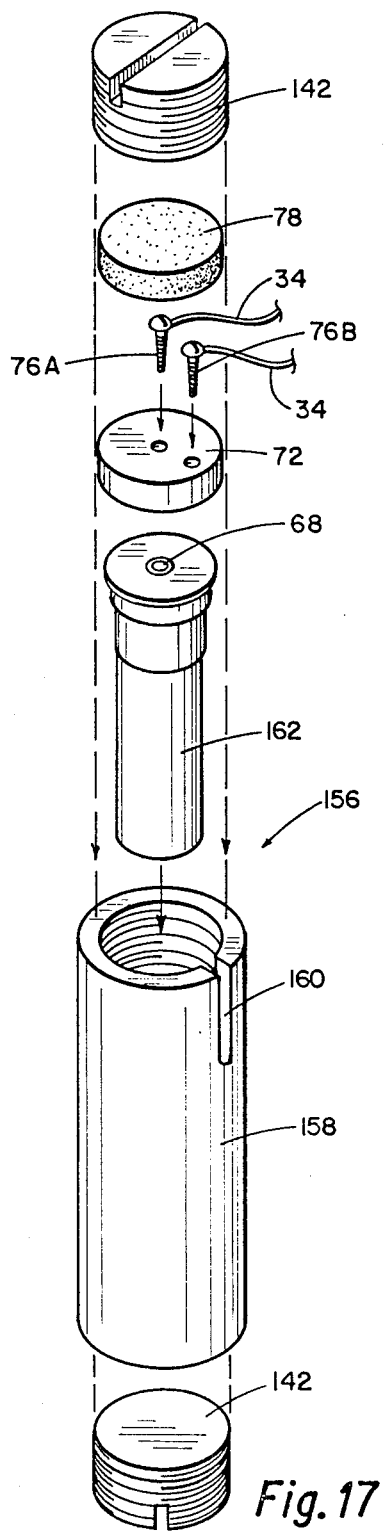
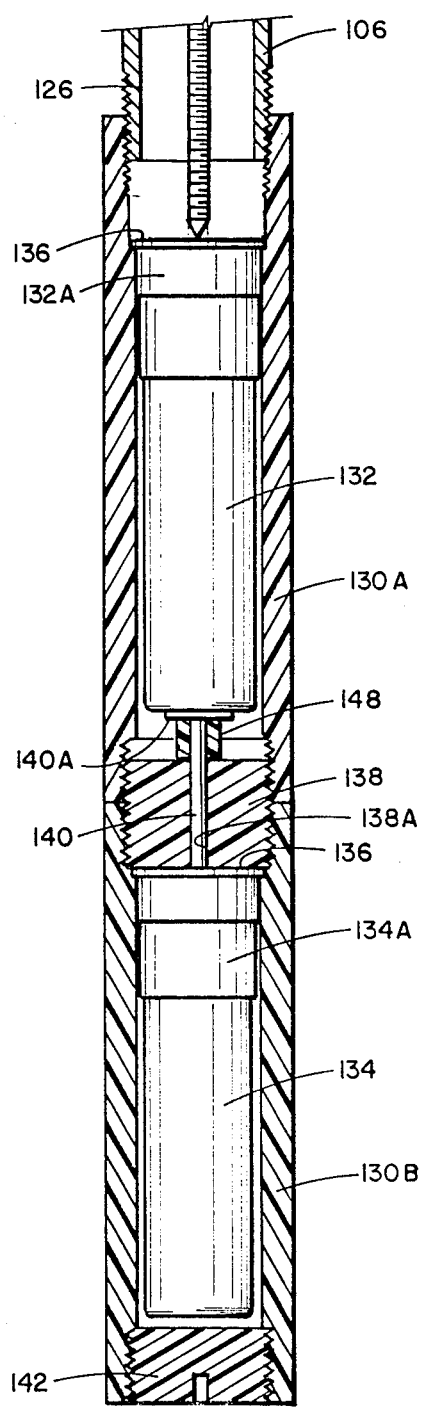
Fig. 17
Fig. 16

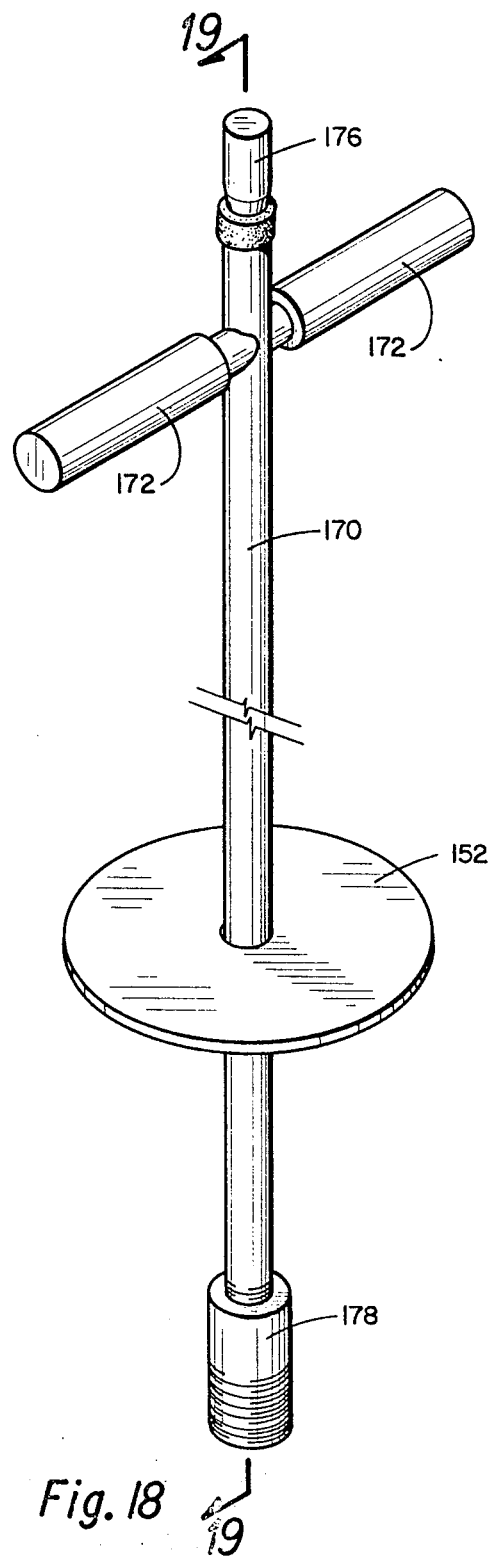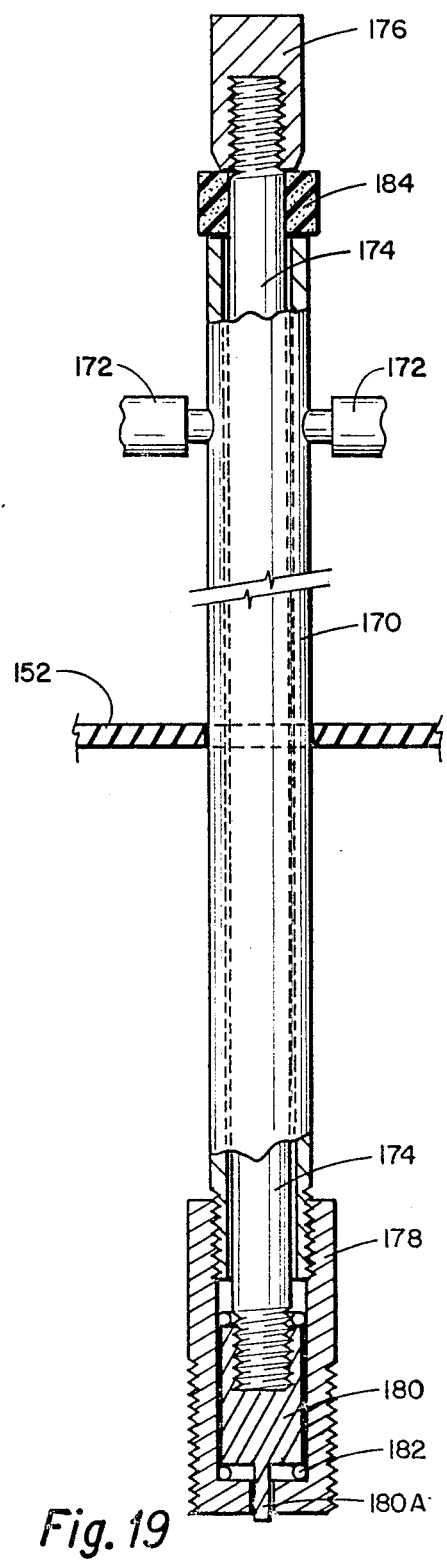

SEISMIC ENERGY SOURCE

SUMMARY OF THE INVENTION

The use of sequentially actuated seismic energy signal sources has important application in seismography. Linear progressive detonation for propagation of seismic waves, if timed and spaced to yield propagation velocities matching the surrounding medium, will reinforce the seismic wavefront in the linear direction of the timed sequential detonations or shots. Such a reinforced, or strengthened wavefront, improves signal-to-noise ratio, which broadens the frequency band width and thus increases the use of frequency content. Multiple low energy shots fired in sequence also diminish shot noise, undesirable surface waves, ghosting, costs of hole preparation and explosive.

The sequentially fired seismic energy source is particularly useful in slant boreholes in the earth. Sequential shots, timed and spaced to match propagation velocity with the surrounding medium, strengthen a slant-directional wavefront. Shear wave propagation is significantly improved by slant-direction sequential shots because shear waves are usually not detectable, and perhaps not generated, directly below a source detonation. Shear wave amplitudes usually appear highest along an arc intercept of about 35 to 55 degrees from vertical, outward and downward from the source shot. Although air velocity of about eleven hundred feet per second is generally considered minimal for wave propagation, surface formations with a lower velocity are sometimes encountered and shear wave velocity ranges downward to ½, ¼ or less, of the velocity of companion P-waves generated by the same detonation. Such low velocity shear waves, propagated at high frequencies, raise resolving power two, four or more times, for fine definition of thin beds, small faults, or equally subtle subsurface features that cannot be detected with conventional P-wave seismic surveys. Propagation velocities from 500 feet per second and upward can be generated by time sequential, progressive detonations, in vertical or slant shot holes of any depth utilizing the system of this invention. In the practice of the invention a borehole is first created in the earth, either vertical or, if the utilization of shear waves is desired, at a slant at about 45° to the horizontal. While the borehole may be formed such as by the use of an auger, one method is to use a surface-fired projectile, such as revealed in U.S. Pat. Nos. 4,223,759 and 4,354,572. The hole can usually be created by one, two or three shots fired in the same location. After the hole is created the assembly for generating seismic signals is placed in the hole.

If only a single shot seismic signal is required, the assembly is formed of a tubular barrel of frangible material, such as plastic. A shell is positioned within the barrel, the shell having a head with an electrically actuated primer button. A continuity block is placed in the barrel and in contact with the shell head providing electrical continuity with the shell and the primer button. Conductors connected to the continuity block extend exteriorly of the barrel and to the earth's surface. The barrel is closed at the top and bottom to make it water-proof. After the assembly is placed in a borehole, the top of the hole is filled with dirt and tamp, the wires extending from the hole. To create a seismic signal, electrical voltage is supplied to the wires, firing the shell which explodes the frangible barrel. To improve performance, the barrel is preferably provided with longitudinal, spaced apart grooves in the exterior surface to augment the bursting of the barrel when the shell is fired.

If a sequential seismic signal is desired, the assembly consists of an elongated tube of stiff material, such as plastic, having upper and lower ends. A first electrically fired shell is supported within the tube adjacent the upper end. At least a second shell is positioned in the tube spaced a predetermined distance from the first shell and in the direction towards the tube's lower end. Such second shell and each additional shell is of the percussion type. Positioned within the tube adjacent each of the percussion shells is a short cylinder of deformable material having a firing pin coaxially carried by it. The firing pin is in alignment with the percussion primer of the adjacent shell. Conductors extend from the tube and connect with a continuity block in contact with the first, electrically fired shell. The assembly is sealed and placed in a borehole in the earth with the conductors extending from the borehole. To generate a sequential seismic signal electrical energy is supplied to the conductors, firing the first shell. The slug from the first shell proceeds down the tube, engaging the firing pin carried in contact with the first percussion fired shell. This causes the first percussion fired shell to fire. The slug from the first percussion fired shell travels down the tube to engage the firing pin to fire the second percussion fired shell. This procedure is repeated until all of the shells in the assembly are fired. By accurately spacing the shells selected distances apart the timing sequence of each shell explosion is accurately predeterminable so that a seismic signal having the characteristic desired for the formation in which the signals are to be propagated can be achieved.

For reference to prior work relating to generating seismic signals, particularly of the sequential form, reference may be had to the following U.S. Pat. Nos. 3,050,149; 3,048,235; 2,992,694; 4,511,999; 3,986,430; 2,953,214; and 4,117,780.

A better understanding of the invention will be had by reference to the following description and claims, taken in conjunction with the attached drawing.

DESCRIPTION OF THE DRAWINGS

FIG. 3 is an elevational cross-sectional view of an assembly for generating sequential seismic signals showing the internal arrangement of the assembly.

FIG. 4 is an exploded view of the components making up an electrical contactor as used in the assembly of FIG. 3.

FIG. 5 is an isometric view of the components of FIG. 4 assembled as ready for use in the sequential seismic generating assembly.

FIG. 6 is a cross-sectional view of the assembly of FIG. 5.

FIG. 7 is a cross-sectional view taken along the line 7—7 of FIG. 3 showing the firing pin as carried by the deformable cylinder for firing a percussion shell by means of the slug discharged from the electrically fired shell.

FIG. 16 is another elevational partial cross-sectional view of the device as taken along the line 16—16 of FIG. 14.

FIG. 17 is an exploded view of an electric hook-up down-hole assembly for firing a single shell.

FIG. 18 is the upper portion of an assembly for percussion firing.

FIG. 19 is a cross-sectional view as taken along the line 19—19 of FIG. 18.

DESCRIPTION OF THE PREFERRED EMBODIMENT

Figure 1:
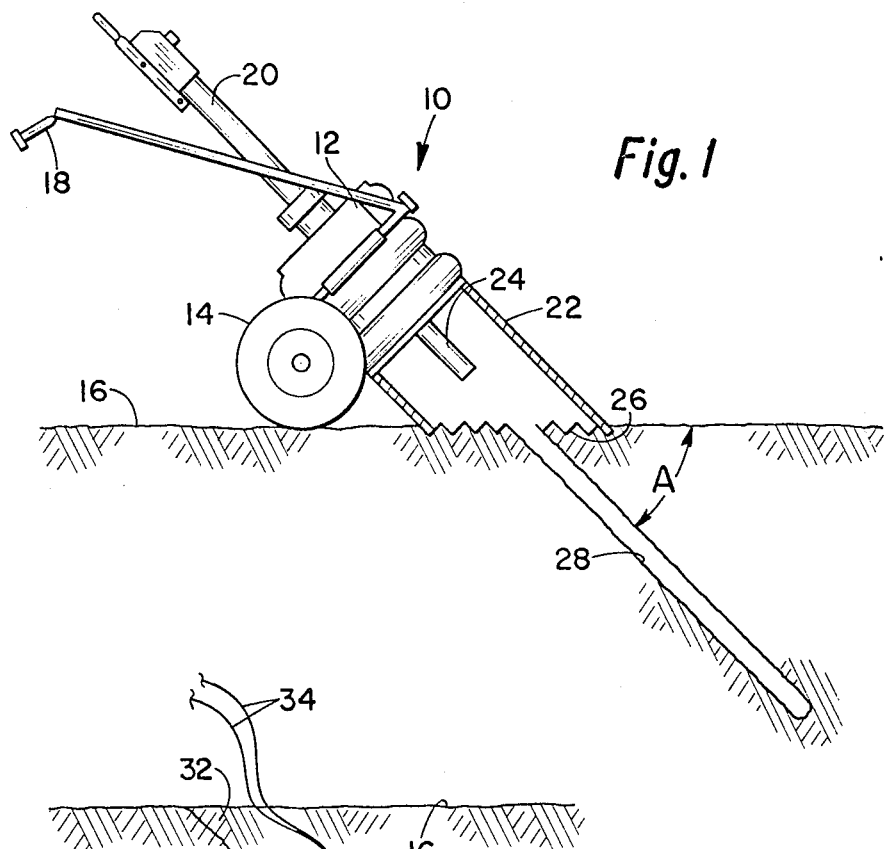
FIG. 1 is an illustration of an apparatus for creating a slant borehole in the earth which is particularly useful for a sequential firing assembly as used for generating seismic signals including shear waves.

Referring to the drawings and first to FIG. 1 a method is illustrated for producing a borehole in the earth for which the present invention may be utilized. While the invention herein is not limited to boreholes formed in a certain way, the view of FIG. 1 shows a convenient method of forming a shallow depth borehole which may be, as illustrated, inclined to the earth's horizontal surface. The apparatus generally indicated by the numeral 10 has a frame 12 mounted on wheels 14 by which it can be moved around on the earth's surface 16 by handle bars 18.

Figures 9, 10:
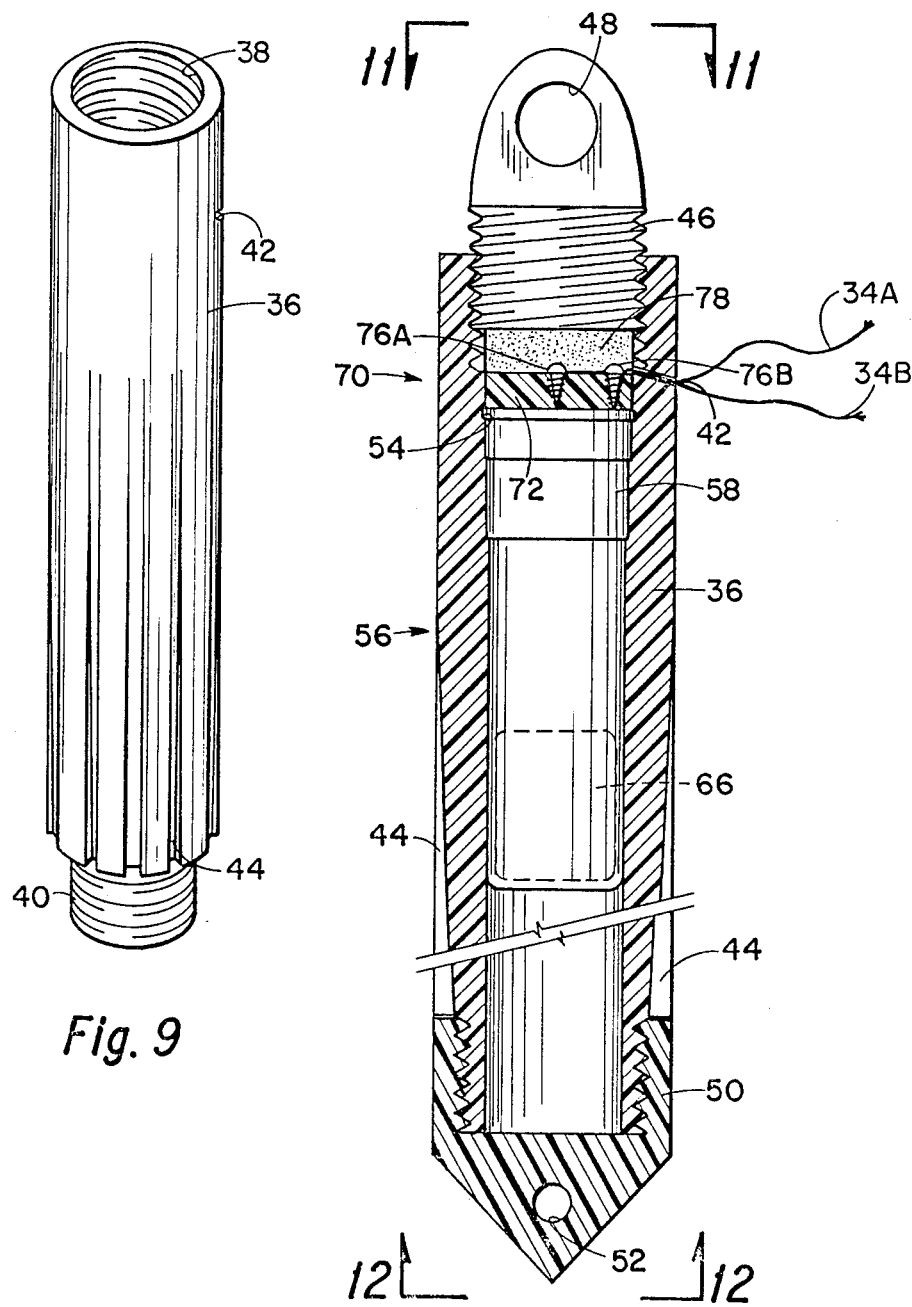
FIG. 9 is an isometric external view of a barrel which may be employed in the practice of the invention.
FIG. 10 is an elevational cross-sectional view of an assembly employing the barrel of FIG. 9 showing the employment of the barrel in a single shot assembly.

Supported on frame 12 is a gun 20 of the type for firing large bore shells, such as eight gauge shotgun shells firing a heavy lead slug. Extending from the lower end of the frame 12 is a tubular shield 22 shown in cross-section. The muzzle 24 of the gun extends downwardly within shield 22. The lower end 26 of the shield is irregularly formed to rest upon the earth's surface. The gun of FIG. 10 is particularly configured to provide a slanted borehole 28 in the earth which preferably is at an angle of about 45° with respect to the earth's surface 16.

To generate a borehole 28 one, two, three or more slugs are fired by the gun. The slugs may be typically three ounces in weight and of iron, zinc or lead. The slugs will typically penetrate to five feet depths or more in relatively rock free soil. One or more of these slugs will open up a hole of a diameter of about two inches or more. The total time required to form such a bore hole is a minute or less, which is much faster than digging a slant hole with an auger or drill.

Figure 2:
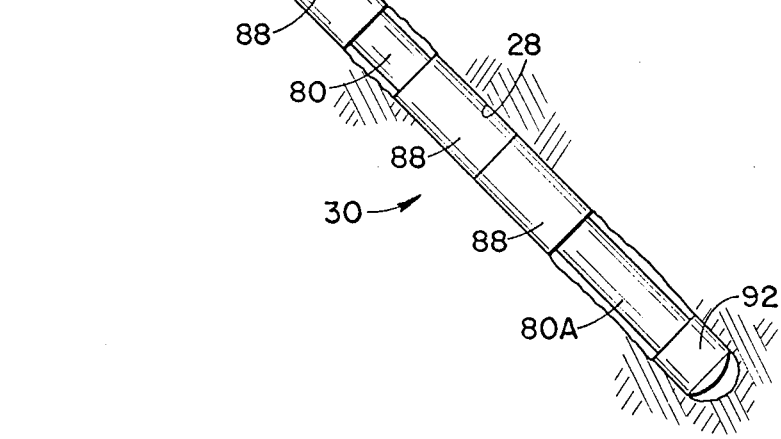
FIG. 2 is an elevational subterranean view of an assembly for sequentially generating seismic signals positioned in an inclined borehole in the earth.

After the borehole 28 is formed, whether by the mechanism indicated by the numeral 10 in FIG. 1, or by other means such as by a drill or auger, an assembly for generating a seismic signal is positioned in the borehole. FIG. 2 shows an assembly for generating sequential seismic signals indicated generally by the numeral 30. The assembly 30 is placed in the borehole so as to be entirely below the surface 16 of the earth and the borehole 28 is backfield at 32. Conductors 34A and 34B extend from the assembly 30 to provide means for initiating a seismic signal.

If a single seismic signal is required, an assembly indicated by FIGS. 9 to 12 is utilized. This assembly includes a tubular barrel 36 made of frangible material, such as plastic. The barrel is preferably formed, as illustrated, with internal threads 38 at the upper end and reduced diameter external threads 40 at the lower end. The barrel 36 has a small diameter opening 42 in the side wall for conductors to extend therefrom and preferably has spaced apart longitudinal grooves 44 formed in the exterior sidewall. The grooves 44 are preferably in a plane of the barrel tubular axis and start below the top and increase in depth towards the lower end having the external threads 40.

FIG. 10 shows a single shot assembly. An externally threaded plug 46 closes the upper end of the assembly, the plug having an opening 48 in it which may be used for attaching a small diameter line or string for lowering the device in a borehole. The bottom end of the barrel is closed by a cap 50 which also has an opening 52.

Figure 8:
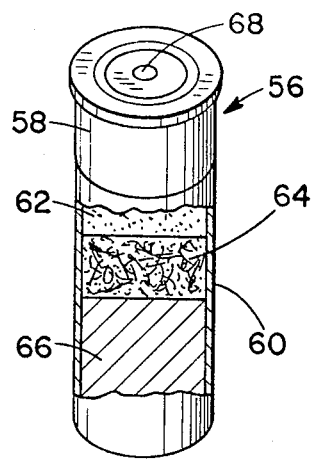
FIG. 8 is an isometric partial cross-sectional view of the components making up a typical shell as utilized by the assembly for generating sequential seismic signals of this invention.
Figure 11:
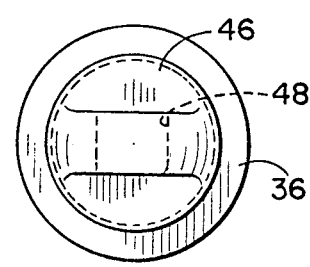
FIG. 11 is an end view taken along the line 11—11 of FIG. 10 of the single shot assembly.
Figure 12:
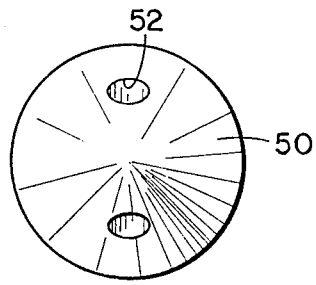
FIG. 12 is an end view taken along the line 12—12 of a single shot assembly of FIG. 10.

Positioned within the barrel 56 on an internal ledge 54 is a shell generally indicated by the numeral 56. The shell has a shell head 58 which has an increased external diameter upper ridge which rests on the internal ledge 54. FIG. 8 discloses more details of a typical shell 56 which, in addition to the shell head 58, normally made of metal such as brass, and a paper or plastic body 60, contains a quantity of explosive powder 62, wading 64, usually made of cotton or the like, and a metal slug 66 which may be of lead, iron or zinc as examples. The shell head 58 includes a primer button 68 which is of two types. In one type the primer button 68 is actuated by an electrical voltage; the shell being thus termed an electrically fired shell. The other type of shell utilizes a primer button 68 which is actuated by deformation, such as being struck by a firing pin and is of the type commonly employed in a typical hunting shotgun.

Returning to FIG. 10, there is positioned within the upper end of the barrel 36 an electrical contactor generally indicated by the numeral 70. Referring to FIGS. 4, 5 and 6 the electrical contactor is better illustrated. In the exploded view of FIG. 4, contactor 70 is formed of a block 72 of insulative material, such as plastic, the block being formed of a short cylinder of external diameter to be slidably positioned within barrel 36. The block has openings 74A and 74B therein which receives screws 76A and 76B, each of which is, at the upper end thereof, affixed to a conductor wire 34. Positioned on top of the block 72 is a compressible pad 78 of insulative material such as made of foam plastic.

The contactor, assembled, appears in FIGS. 5 and 6 with the screws 76A and 76B threaded into opening 74A and 74B and with the conductors attached to the heads of the screws. Next the compressible pad 78 is glued onto the block 72. The lower ends of screws 76A and 76B extends slightly below the lower end of block 72 as shown in FIG. 6. In the single shot assembly of FIG. 10 the shell is placed in the tube 36 and the contactor 70 is positioned in the tube with the conductors 34 extending through opening 42. Next the top plug 46 is screwed into position which engages the compressible pad 78 to thereby hold the contactor in engagement with the head 58 of the shell 56. The screws are arranged so that the middle screw 76A contacts the primer button 68 of the shell and the other screws 76B contact the outer metallic portion of the shell. The end cap 40 closes the lower end so that the entire assembly is waterproof. These assemblies can be made up in advance for use as necessary.

When a single shot is required the assembly of FIG. 10 is placed in a borehole 28 and back fill is placed in the top of the borehole and tamped down. The conductors 34A and 34B extend above the earth's surface. To generate a single seismic-signal, electrical voltage is supplied to the conductors 34, firing the electrically actuated shell 56. When the shell is fired it explodes creating a seismic signal. The slug 66 is discharged. The barrel 36, being of frangible material, gives limited directional guidance to the slug. Upon firing, the slug passes down to the end of the barrel and the barrel sides split along grooves 44. The grooves will split from the bottom upwardly, which will make the ruptured barrel into somewhat of a cone shape that will direct the blast downwardly. The rupture of the barrel tends to anchor it to the side wall of the borehole and limit its upward propulsion.

Turning now to FIG. 3 an alternate embodiment of an assembly is employed showing means of practicing the invention for firing a sequential seismic signal wherein the assembly is made up primarily of readily available plastic piping components. In the arrangement of FIG. 3, tubular members 80 and 80A are barrels. Separate portions 82 have the typical configuration of a plastic pipe coupling. Each coupling 82 is of external diameter slightly less than the internal diameter of barrels 80 and 80A, and each has an internal ledge 84. The upper coupling member 82 receives an electrically fired shell 56, the head of the shell resting on the ledge 84. The lower coupling member 82 has a percussion fired shell generally indicated by the numeral 86. Larger diameter couplings 88 connect the members 80, 80A and 82 together, the portions being assembled in the way the plastic pipe is typically assembled using solvent adhesive. The top is closed with a cap 90 and the bottom with a cap 92 so that the entire device is waterproof. A contactor assembly 70 is positioned in engagement with the electrically fired shell 56. The contactor 70 of FIG. 3 has a thicker compressible pad 78A to compensate for the changes in dimensions of the assembly.

A percussion firing device is generally indicated by the numeral 94 and is formed of a cylinder 96 of compressible material, such as plastic foam, and a firing pin 98 having a head 98A. The firing pin 98 is in axial alignment with the primer button of the percussion fired shell 86.

When the assembly 30 of FIG. 3 is positioned in a borehole in the earth, such as shown in FIG. 2 an electric voltage is applied to conductors 34, the electric shell 56 is caused to fire. The slug from shell 56 moves downwardly to engage firing pin head 98A. The firing pin 98 is driven into the primer cap and percussion shell 86 fires thereby generating sequential seismic signals.

Figure 13:
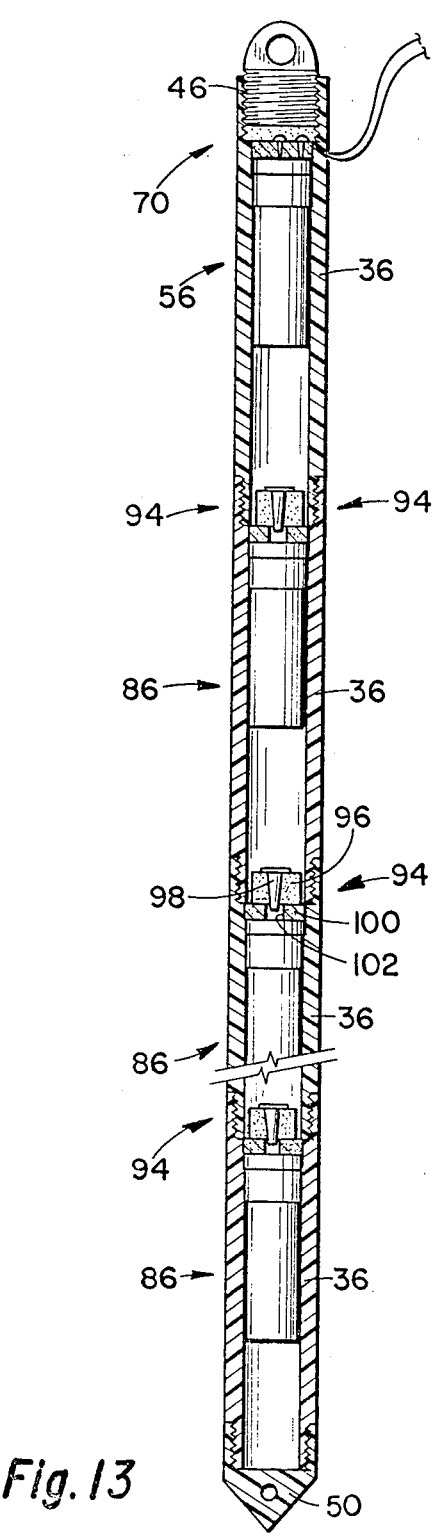
FIG. 13 is an elevational, cross-sectional view of a multi-shot sequentially fired assembly made up using barrels of the type shown in FIGS. 9 and 10.

FIG. 13 shows an assembly made up of the barrels 36 of FIGS. 9 and 10. The percussion firing device 94 as used on each of the percussion shells 86 is slightly different in that it is formed of a third component, that is, a small cylindrical disc 100 having a hole 102 in it. The disc 100 may be made such as of a plastic and is bonded to the compressible cylinder 96 which retains the firing pin 98. Each disc 100 is dimensioned to fit snugly within the upper end of barrels 36 in engagement with percussion firing shells 86.

FIG. 13 shows an assembly for generating sequentially in precisely time spaced intervals, four seismic signals. With barrels 36 of approximately six inches in length the distance from shell head to shell head is six inches which will produce a sequential firing of the shells separated in time by 0.001 seconds. The propagation velocity of this assembly is typically 500 feet per second with each detonation being 0.001 seconds apart. Obviously, the assembly of FIG. 3 can be formed into as many sequential firings as is desired.

The assemblies of this invention, whether a single shot, or multiple shot, are made up in advance and utilized in the field by operators. Since the assemblies are waterproof they can be positioned in boreholes, even if water filled, and left for a length of time before being fired.

Figure 23:
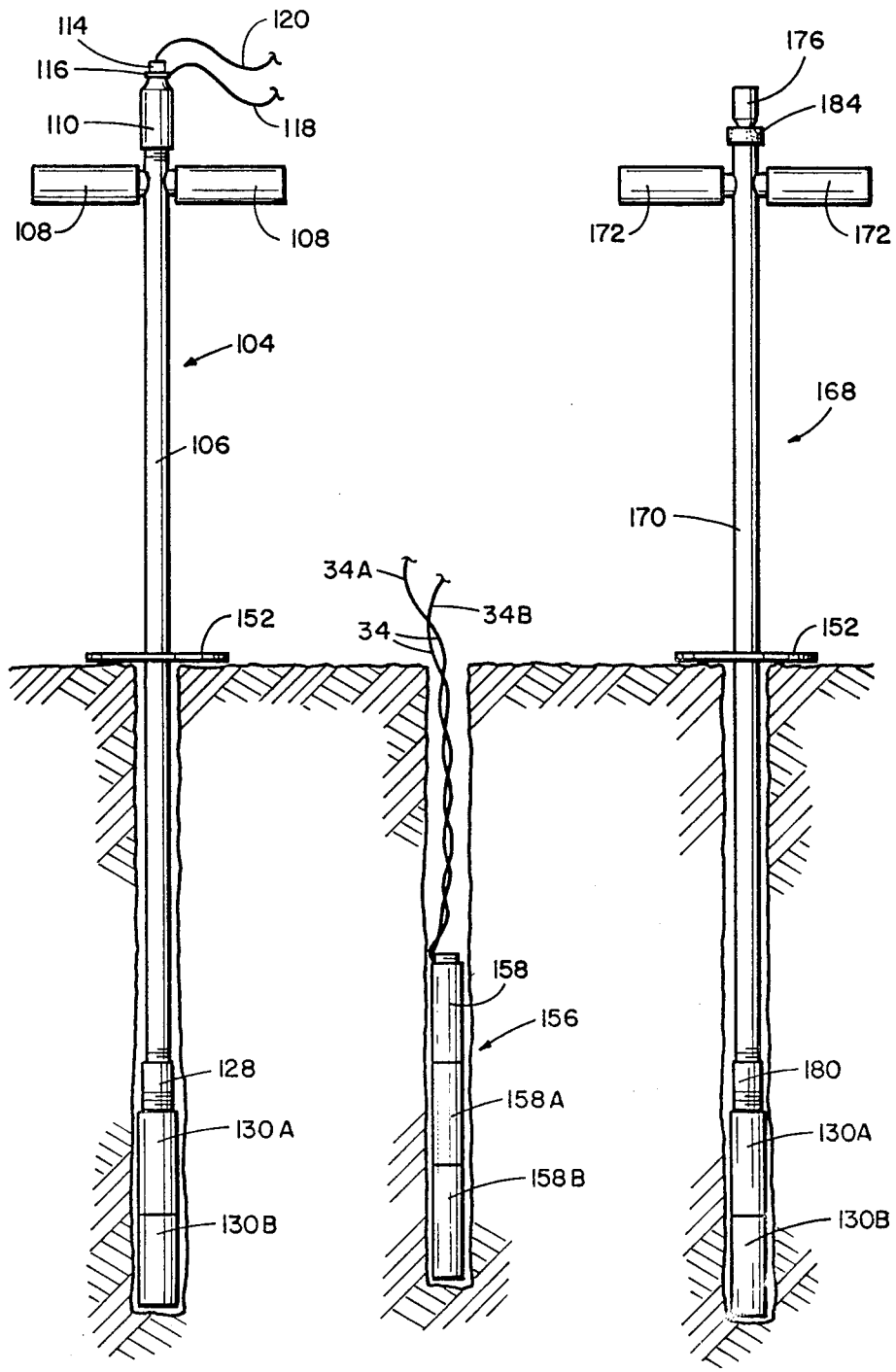
FIG. 23 is an elevational view illustrating side by side, the three basic means of practicing the invention, that is, showing on the left, a downhole electric firing rod assembly, in the middle a downhole electric wired assembly and, on the right, a downhole percussion firing rod assembly.

Referring to FIG. 23, the three different methods wherein the invention may be practiced are best illustrated. On the left of the figure is an illustration of an electric fired seismic energy source utilizing a firing rod. In the center is an illustration of a downhole electric seismic generating source practiced without the use of a firing rod. On the right is an illustration of a downhole seismic energy source fired by a percussion firing rod.

Figure 14:
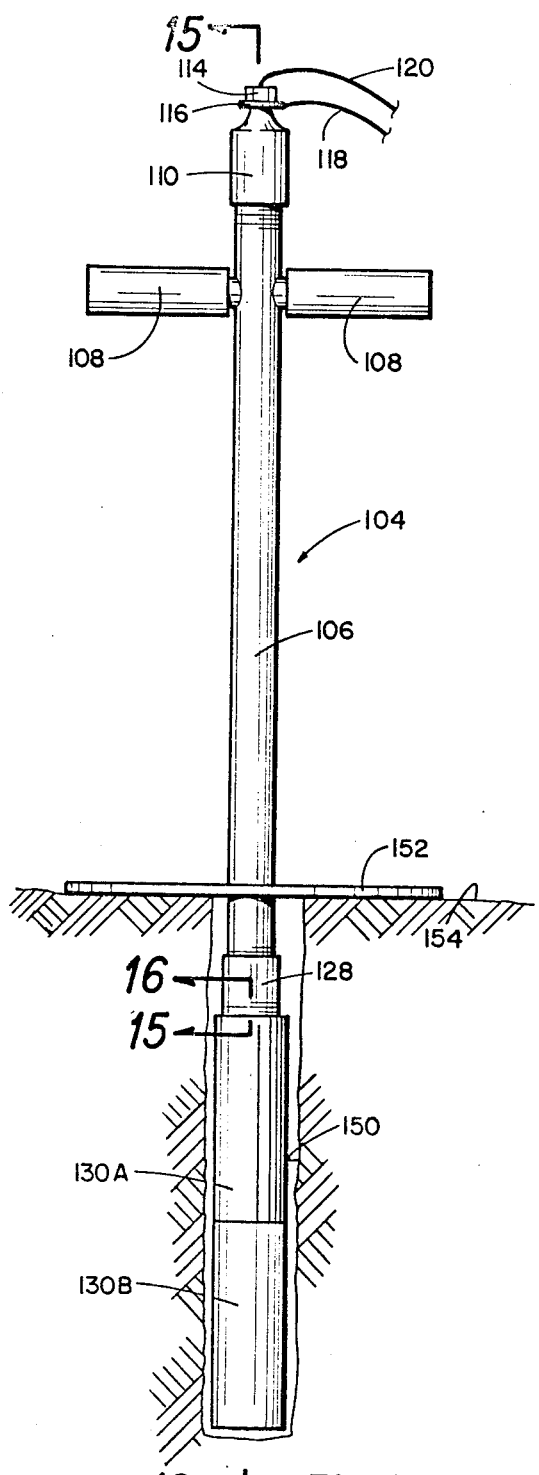
FIG. 14 is an elevational view of a down-hole assembly arranged for electric initiation utilizing a firing rod.
Figure 15:
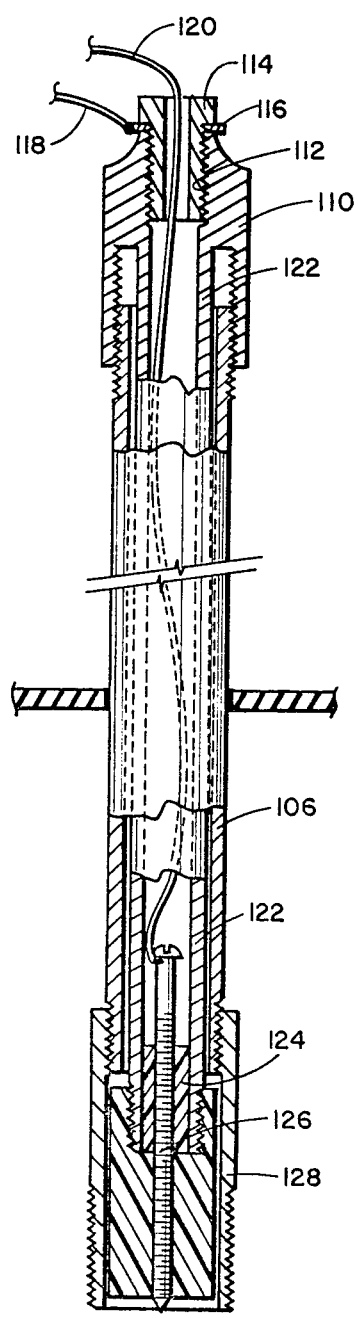
FIG. 15 is a partial elevational cross-sectional view of the device as taken along line 15—15 of FIG. 14.

The downhole electric firing assembly is generally indicated by the numeral 104 and it is illustrated in better details in FIGS. 14, 15 and 16. The assembly includes a tubular body member 106 preferably formed of metal having integrally extending handles 108. At the top of the tubular body 106 is a head 108 which has internal threads of the lower end engaging external threads at the upper end of the tubular body, and having internal threads 112 at the upper end. Received within the internal threads is a tubular connector 114 which receives a washer 116. A conductor 118 is affixed to washer 116. A second conductor 120 extends from within the interior of tubular body 106. Head member 110 has an internal tubular portion 122 of external diameter less than the internal diameter of tubular body 106. The tubular portion 122 extends concentrically within tubular body 106. At the lower end of the tubular extension 122 is insulation block 124 which receives a screw 126. Conductor 120 is connected to the head portion of screw 126.

Affixed to the lower end of the tubular body 106 is a coupling 128 to which is secured the shell containing portion of the apparatus which is shown in cross-sectional view in FIG. 16. Affixed to the lower end of the coupling 128 is a tubular shell capsule 130A made such as of plastic. Shell capsule 130A receives a shell 132, having a head portion 132A with a circumferential lip portion of external diameter greater than of the balance of the shell. The lip portion rests on a ledge 136. Shell capsule 130A has internal threads at the upper and lower end. A second shell capsule 130B, which is substantially identical to capsule 130A, is shown containing a shell 134. Shell capsules 130A and 130B are joined together by externally threaded plug 138 which has a central opening 138A therethrough. Received in opening 138A is a plunger 140 having a head 140A at the upper end thereof. The lower end of capsule portion 130B is closed with a plug 142.

Positioned within the upper end of the upper capsule 130A is a block 144 formed of insulating material having a first screw 146 therein. Screw 146 extends through the block and the lower end thereof contacts the electrically actuatable primer button of upper shell 132. A second screw 147 is connected to tubular body member 106. The lower end of screw 147 contacts the metal head 132A of shell 132.

To arm the system of FIGS. 14, 15 and 16, head 110 is rotated with respect to the tubular body member 106 to lower the tubular extension 122. This is done until the lower end of screw 126 contacts the head of screw 146. This establishes electrical contact between conductor 120 and the screw 146 which in turn is in engagement with the primer button of upper shell 132. To fire shell 132, an electrical potential is applied to conductors 118 and 120. When shell 132 fires the slug therefrom engages firing pin 140, driving it down to fire shell 134. It can be seen that as many additional shells may be employed by attaching capsules with a plug 138 and firing pin 140 between each successive lower shell. All of the assembly below the tubular body member 106 is preferably formed of plastic except the screws 146 and 147 and plunger 140. To retain plunger 140 so as to prevent inadvertent firing of the shell 134, a plastic sleeve 148 is received below head 140A.

FIG. 14 shows the assembly with the lower portion in a hole 150 formed in the earth which can be either a vertical hole or a slanted hole 128 as shown in FIG. 1. To retain blowout and splatter from possibly causing injury when the shells are fired, a plastic or rubber flange 152 is positioned on the tubular body 106 and engages the earth's surface 154.

Returning to FIG. 23, the middle illustration is of a downhole electric wired seismic generating signal assembly generally indicated by the numeral 156. The assembly employs a capsule 158 internally threaded at its upper and lower end a shown in FIG. 17 and having a slot 160 therein. A shell 162 fits in the capsule and the lower end of the capsule is closed by a plug 142. A block 72, as previously described, having screws 76A and 76B with conductors 34 and 34A extending therefrom, is placed in position so that the screws engage the head and firing pin 68 of shell 162. A compressable pad 78 fits on top of the block 72 and a second plug 142 closes the upper end of the capsule 158. With the capsule assembled and electrical voltage applied to the conductors 34A and 34B, the shell 162 is fired creating a seismic signal. Sequential shells can be fired by attaching other capsules to the lower end of capsule 158 in the manner as shown in the lower portion of FIG. 16. The central reference in FIG. 23 shows the use of three such capsules with capsules 158A and 158B added to the assembly.

Figure 20:
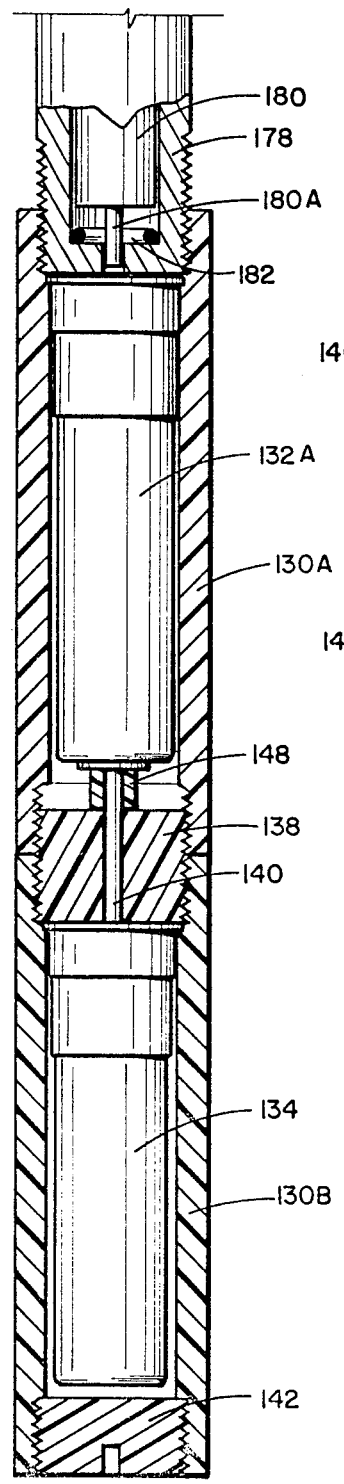
FIG. 20 is a cross-sectional view of the lower portion of a percussion firing assembly showing the arrangement for firing two shells in sequence.

The right hand portion of FIG. 23 shows a percussion firing assembly generally indicated by the numeral 168. The details of this assembly are best shown in FIGS. 18, 19 and 20. An elongated tubular body 170 has handles 172 at the upper end and telescopically receives a firing rod 174 which is threaded at its upper and lower end. At the upper end is an enlarged diameter head 176.

Affixed to the lower end of body 170 is a coupling 178 which is externally threaded at its lower end and which receives a metal firing pin 180 attached to the lower end of firing rod 174. The firing pin 180 has a small diameter proportion 180A extending out an opening in the lower end of the coupling 178. A resilient gasket, such as an O-ring 182 is positioned between the firing pin 180 and internal lower end of the coupling.

The lower portion of the percussion firing assembly is shown in FIG. 20 and is formed of capsules as previously described with reference to FIG. 16, the upper capsule being indicated by the numeral 130A and the lower capsule 130B. Except for the fact that the upper shell 132 is fired by percussion in the arrangement of FIG. 20 the balance of the assembly is the same as described with reference to FIG. 16.

To operate the percussion firing assembly the head 176 is struck, such as by a hammer. This drives the firing rod 174 downwardly. To retain the firing rod in nonactuated position, a resilient washer 184 is placed between the upper end of tubular body 170 and the head 176. The washer 184 is of such resiliency that a heavy blow is required to drive the firing rod 174 downwardly so that the shells are not inadvertently fired. When the firing rod is driven downwardly the firing pin lower reduced diameter portion 180A engages the primer buttom of shell 132A firing it. Thereafter shell 134 is fired in sequence as previously described. If an additional number of shells is to be fired they can be assembled on the lower end of capsule 130B in any number required.

Figure 21:
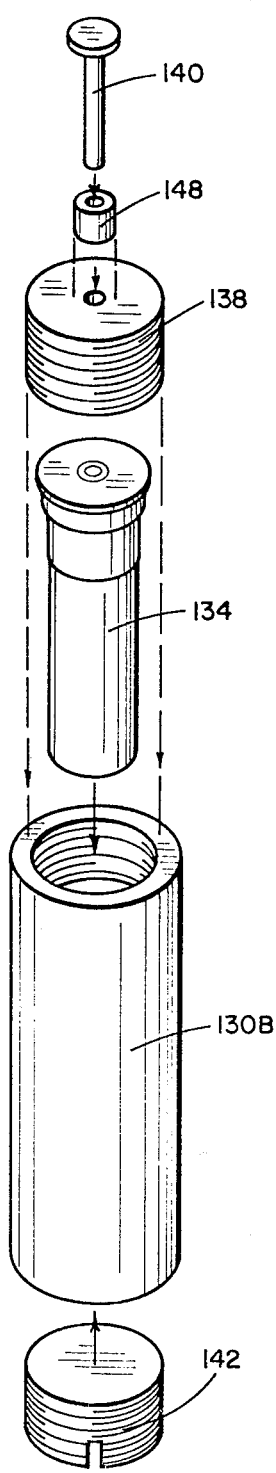
FIG. 21 is an exploded view of a mechanism for firing a single shell for use in conjunction with the percussion firing assembly of FIGS. 18 and 19.

FIG. 21 shows the percussion assembly as used in the lower portion of FIGS. 16 and 20 in telescopical relationship.

Figure 22:
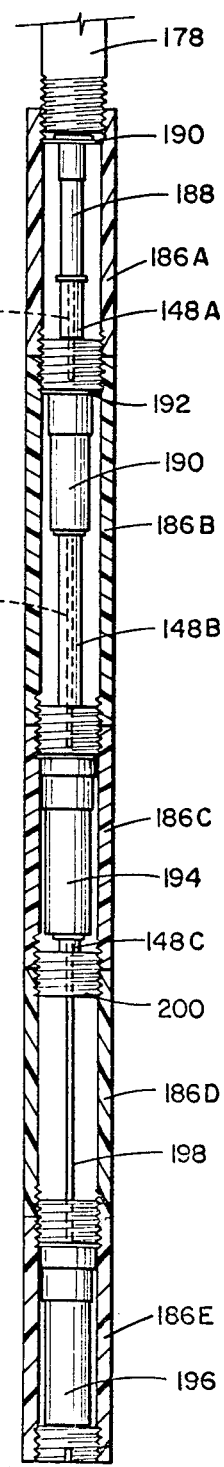
FIG. 22 shows an elevational cross-sectional view of an assembly for firing a plurality of shells of different gauges, utilizing the percussion firing assembly of FIGS. 18 and 19.

FIG. 22 shows an alternate arrangement of the invention where various caliper shells are used. This figure shows the use of five capsules numbered 186A through 186B of the configuration as illustrated in views 16 through 21 except that some of the capsules are of different lengths. The capsules are shown secured to coupling 178 forming the bottom end of the percussion firing assembly. A small diameter shell 188, such as a 410 gauge shell, is retained in capsule 186A by means of a washer 190. An elongated firing pin 140B is used to compensate for the shorter length of shell 188. The next lower shell is 190, which is of a different caliber such as a 20 gauge shotgun size shell, and also is supported by a washer 192. The firing pin 140C is extra long to take care of the fact that the capsule 186B is extra long. The resilient sleeve 148B is also extra long. Shell 194 is a twelve gauge size. An extra long firing pin 198 is used to allow an increased physical spacing between shell 194 and shell 198. A washer 200 supports the resilient sleeve 148C to retain firing pin 198 in the non-fired position until shell 194 is fired.

FIG. 22 merely illustrates the fact that the invention may be practiced in a variety of ways using different gauge shells and different spacing between shells.

The claims in the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An assembly for generating sequentially seismic signals in a borehole in the earth comprising:
    an elongated tube of stiff material having an upper and lower end;
    a first shell supported within said tube adjacent said upper end thereof;
    at least a second shell positioned in said tube spaced a preselected distance from said first shell and in the direction toward said tube lower end, each said shell being in the form of an elongated cylindrical cartridge having means at one end to fire the shell and having an explosive and a slug within the shell cartridge, said tube having said shells therein being positionable in a borehole in the earth;
    means to fire said shell whereby said slug therein is propelled within said tube in the direction towards said second shell, the first shell generating a seismic signal when it is fired;
    means within said tube to fire said second shell upon the impact of said first shell slug whereby a second seismic signal is generated, the sequence of seismic signals generating a timed seismic signal pattern.

2. An assembly for sequentially generating seismic signals in a borehole according to claim 1 wherein said first shell is electrically fired and said second shell is percussion fired.

3. An assembly for sequentially generating seismic signals in a borehole according to claim 2 wherein said tube is sealed before insertion into a borehole.

4. An assembly for sequentially generating seismic signals in a borehole according to claim 1 wherein said second shell has a percussion cap in the end thereof and wherein said means within said tube to fire said second shell includes:
    a short cylinder of deformable material of external diameter to be received within said tube adjacent said second shell; and
    a firing pin co-axially carried by said cylinder in axial alignment with said second shell percussion cap whereby when said slug from said first shell strikes said firing pin it is driven into said second shell percussion cap to fire said second shell.

5. An assembly for sequentially generating seismic signals according to claim 4 wherein said firing pin has an enlarged diameter head on the end thereof in the direction towards said first shell.

6. An assembly for sequentially generating seismic signals according to claim 2 wherein said first shell has a central firing center and an annual firing contact at one end and including:
    a short cylinder of insulating material having a first and second electrically conductive member extending therefrom, the electrically conductive members being oriented to engage said first shell control and annular firing contacts;
    electrical conductors attached to said electrically conductive members and extending sealably exteriorly of said tube whereby a voltage may be applied to the conductors to fire said first shell; and
    means to maintain said cylinder of insulative material juxtaposed to said first shell with said electrical conductive members in engagement with said first shell electrical contacts.

7. A method of generating sequential seismic signals in the earth comprising:
    forming a borehole in the earth;
    positioning in the borehole an elongated tube of diameter less than the borehole and having a plurality of shells therein, each shell having an explosive and a slug therein, the shells being in axial alignment within the tube and spaced from each other a preselected distance;
    firing the first shell in said axial alignment, the slug of which strikes the next adjacent second shell to fire it, and the slug of the second shell striking the next adjacent shell to fire it until all the shells in the tube have been fired, each shell upon firing, generating a seismic signal, the time spacing between the seismic signals being controllable by the physical spacing between shells in the tube.

8. A method of generating sequential seismic signals in the earth according to claim 7 wherein said borehole is drilled at an angle of about 45° to the horizontal and wherein said seismic signals are propagated, at least in part, as shear waves in the earth.

9. A method of generating a seismic signal according to claim 8 wherein said first shell is fired electrically.

10. A method of generating a seismic signal according to claim 8 wherein said first shell is fired by percussion.

11. An assembly for generating seismic signals in a borehole in the earth comprising:
    a tubular barrel of frangible material such as plastic, a shell supported within said tubular barrel, the shell having an electrically conductive metallic head with an electrically actuated primer button, said barrel having spaced-apart grooves formed in the exterior surface thereof to augment the bursting of said barrel when said shell is fired;
    continuity means within said barrel providing electrical continuity with said shell head and with said primer button;
    conductors connected to said continuity means and extending externally of said barrel, said shell being fired by connecting the conductors to a voltage source; and
    means to close the ends of said barrel.

12. An assembly for generating seismic signals according to claim 11 wherein said grooves are longitudinal and in planes of said barrel tubular axis.

* * * * *